United States Patent Office 2,780,570
Patented Feb. 5, 1957

2,780,570

AIR-HARDENING TOOL STEEL

John Y. Riedel, Bethlehem, Pa., assignor to Bethlehem Steel Company, a corporation of Pennsylvania No Drawing. Application December 4, 1953,
Serial No. 396,337

1 Claim. (Cl. 148—31)

This invention relates to improvements in tool steel alloys.

The object of this invention is to produce a tool steel alloy which, within a relatively narrow range of its principal constituents, will be suitable for a wide range of service applications including particularly those where great resistance to shock is essential.

I have succeeded in developing an air-hardening tool steel of the chromium-molybdenum type which, within the range of analysis given below, has exceptional shock resistance, excellent machinability, and low distortion in heat treatment.

Broadly speaking, my invention comprises a tool steel, the analysis of which is included within the following ranges:

|  | Percent |
|---|---|
| Carbon | .25–.55 |
| Manganese | .60–1.00 |
| Silicon | .15–.40 |
| Chromium | 2.25–3.50 |
| Molybdenum | .40–1.50 |

Within the above ranges, the proportions of the several elements may be varied for different applications.

A specific example of a narrow range of analysis which is encompassed within the above broader range, and which has proven satisfactory for a number of applications requiring great toughness, for example in rivet sets, punches, blanking and forming dies, hot headers, gripper dies, etc., is as follows:

|  | Percent |
|---|---|
| Carbon | .48–.53 |
| Manganese | .60–.80 |
| Silicon | .15–.40 |
| Chromium | 3.00–3.50 |
| Molybdenum | 1.30–1.50 |

In actual use under extreme working conditions, tools made of this alloy have exhibited remarkable shock resistance.

An example of a somewhat different analysis within the broad ranges of my invention which is particularly suitable for hollow drills is as follows:

|  | Percent |
|---|---|
| Carbon | .28–.33 |
| Manganese | .90–1.10 |
| Silicon | .15–.40 |
| Chromium | 2.25–2.75 |
| Molybdenum | .40–.60 |

In addition to being air-hardening, the steel of this invention has shown excellent machinability and very low distortion in heat treatment. It possesses good hot-work characteristics. In cases where greater abrasion resistance is desired, this steel may be carburized by standard procedures.

I claim:

An article of manufacture characterized by high resistance to shock and made from an air-hardened tool steel containing .48% to .53% carbon, .60% to .80% manganese, .15% to .40% silicon, 3.00% to 3.50% chromium and 1.30% to 1.50% molybdenum, with the balance being substantially all iron.

References Cited in the file of this patent

FOREIGN PATENTS 344,822     Great Britain _____ Mar. 11, 1931

OTHER REFERENCES

Molybdenum-Steels-Irons-Alloys, pages 244 and 343. Pub. in 1948 by the Climax Molybdenum Co., New York.